US005613592A

United States Patent [19]
Reznik et al.

[11] Patent Number: 5,613,592
[45] Date of Patent: Mar. 25, 1997

[54] SYSTEM FOR READILY DETERMINING THE MAGNETIC ORIENTATION OF PERMANENT MAGNETS

[75] Inventors: Svetlana Reznik, Rochester; Edward P. Furlani, Lancaster, both of N.Y.

[73] Assignee: Eastman Kodak Company, Rochester, N.Y.

[21] Appl. No.: 467,249

[22] Filed: Jun. 6, 1995

[51] Int. Cl.⁶ .................................................. B65G 47/24
[52] U.S. Cl. .................................................. 198/381
[58] Field of Search .................. 198/381, 619, 198/690.1

[56] References Cited

U.S. PATENT DOCUMENTS

| 4,143,472 | 3/1979 | Murata et al. ............................. 35/66 |
| 5,018,979 | 5/1991 | Gilano et al. ............................. 434/409 |

FOREIGN PATENT DOCUMENTS

| 6-24543 | 2/1992 | Japan ........................................ 198/381 |
| 5-92809 | 4/1993 | Japan ........................................ 198/381 |
| 0495992 | 4/1978 | U.S.S.R. .................................... 198/381 |

*Primary Examiner*—James R. Bidwell
*Attorney, Agent, or Firm*—Peyton C. Watkins

[57] ABSTRACT

A system for readily determining the magnetic orientation of permanent magnets for mass assembly in a predetermined orientation into electronic or mechanical devices, the system comprises a first movable conveyor having a first surface which is magnetically polarized in a predetermined orientation. The magnets are individually placed on the first conveyor by a second conveyor which, in association with the first conveyor, orients the magnets in a preferred orientation on the first conveyor. A motor for moving the first conveyor is attached to it for passing the magnets through a mass production assembly.

7 Claims, 1 Drawing Sheet

SYSTEM FOR READILY DETERMINING THE MAGNETIC ORIENTATION OF PERMANENT MAGNETS

FIELD OF THE INVENTION

The invention relates generally to the field of permanent magnets and, more particularly, to a system for readily determining the magnetic orientation of the permanent magnets for mass assembly in a predetermined orientation into cameras and other similar devices.

BACKGROUND OF THE INVENTION

Cameras and other similar devices typically contain miniature, bi-polar permanent magnets positioned in a preferred magnetic orientation for permitting various functions during operation. The magnets usually include two different-color layers of paint respectively on each end for indicating the north and south poles. During the camera assembly process, the miniature magnets are manually placed in the camera by manipulating tweezer-like devices. The paint distinguishes the two poles so that the operator can insert the magnet into the camera with the correct magnetic orientation.

It is also instructive to note that visual markings such as placing a letter "N" for indicating the north pole or "S" for indicating the south pole are impractical since the magnets are very small and, consequently, any such markings would be difficult to see without the use of expensive visual enhancement equipment.

Although the presently known and utilized method and device are satisfactory for placing the magnets in the camera, they are not without drawbacks. The paint may become discolored and the like during the assembly process, which obviously makes distinguishing the poles difficult. If this occurs, a Gauss meter or compass is required for distinguishing the two poles, as is well known in the art. This, however, is time consuming and, therefore, undesirable.

Consequently, a need exists for a system for readily determining the magnetic orientation of permanent magnets for mass assembly in a predetermined orientation into cameras and other similar electronic or mechanical devices.

SUMMARY OF THE INVENTION

The present invention is directed to overcoming one or more of the problems set forth above. Briefly summarized, the invention resides in a system for readily determining the magnetic orientation of permanent magnets for mass assembly in a predetermined orientation into electronic or mechanical devices, the system comprising: (a) a movable conveyor having a first surface which is magnetically polarized in a predetermined orientation; (b) means for individually placing the magnets on said conveyor which, in association with said conveyor, orients the magnets in a preferred orientation on said conveyor; and (c) means for moving said conveyor belt for passing the magnets through a mass production assembly.

It is an object of the present invention to provide a system for readily determining the magnetic orientation of permanent magnets for mass assembly in a predetermined orientation into cameras and other similar electronic or mechanical devices.

The above and other objects of the present invention will become more apparent when taken in conjunction with the following description and drawings wherein identical reference numerals have been used, where possible, to designate identical elements that are common to the figures.

BRIEF DESCRIPTION OF THE DRAWINGS

In the course of the following detailed description, reference will be made to the attached drawing in which.

DETAILED DESCRIPTION OF THE INVENTION

Figure 1:
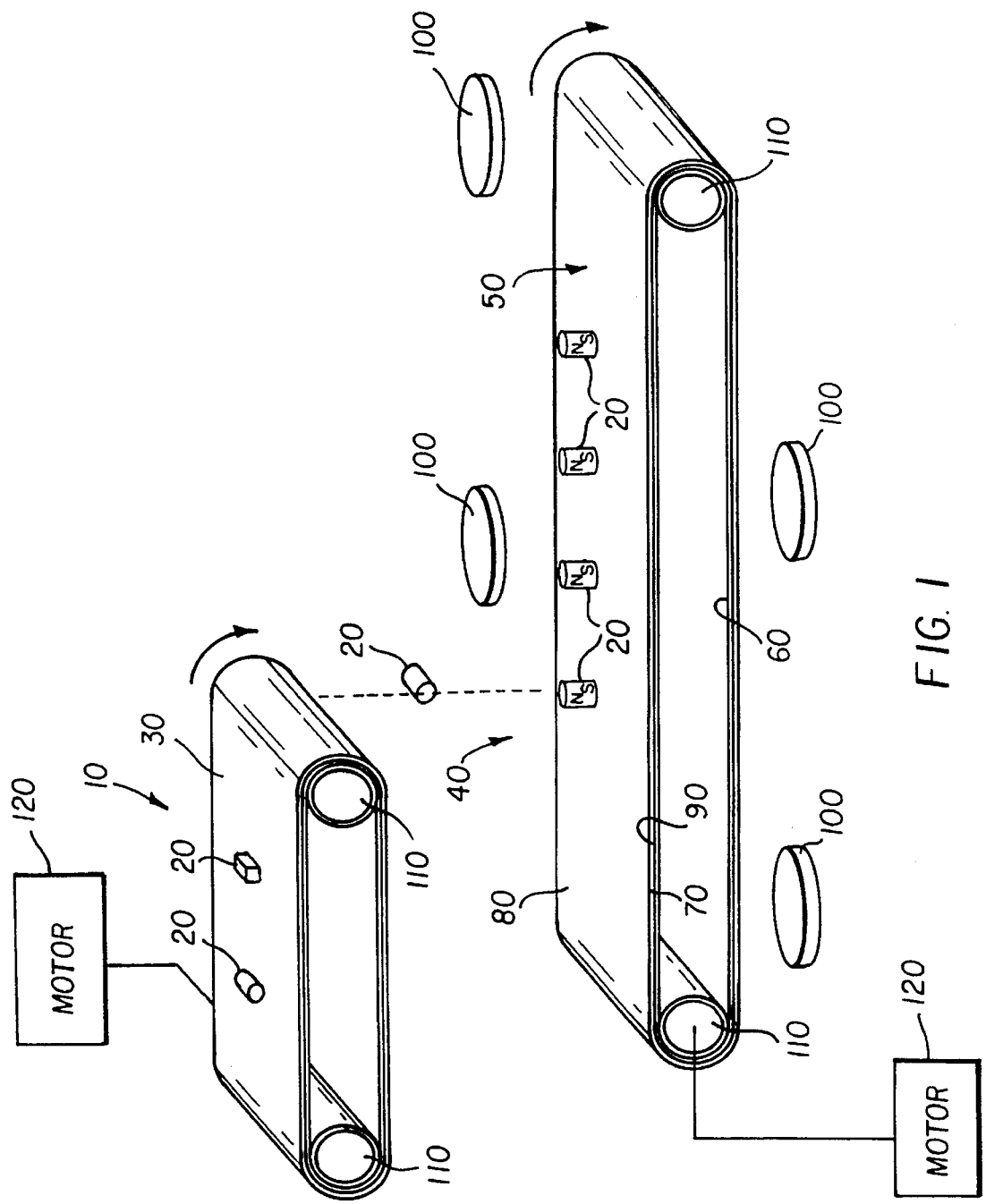
FIG. 1 is a perspective view illustrating the system of the present invention for readily determining the magnetic orientation of permanent magnets for mass assembly into electronic or mechanical devices.

Referring to FIG. 1, there is illustrated a first movable conveyor 10 having a plurality of miniature, bi-polar magnets 20 (i.e., a north and south pole on each end of the magnet) resting on a first conveyor belt 30 for ultimate assemble into a camera (not shown). The first conveyor belt 30 vibrates for permitting separation of the magnets 20 as they rest on the first conveyor belt 30. The first conveyor belt 30 rotates in the direction illustrated by the arrows for dropping the magnets 20 onto a second movable conveyor 40. Although in the preferred embodiment a first conveyor belt 30 is shown for dropping the magnets 20 onto the second conveyor 40, the magnets 20 may be manually dropped onto the second conveyor 40 or by any similar means. It is instructive to note that the magnets 20 will not substantially cling together as they drop onto the second conveyor 40 because of the vibration motion of the first conveyor belt 30 or, in other words, individually.

The second conveyor 40 includes a second conveyor belt 50 having a first 60 and second layer 70. The first layer 60 is made of any well known conveyor belt material, such as rubber. The second layer 70 is created by mixing a flexible binder material such as nitrate rubber or any other elastomer material with either a ferrite material (for example barium ferrite) or a rare-earth material (for example samarium cobalt or neodymium-iron-boron) for creating a magnetized, flexible material. The second layer 70 includes a top surface 80 which is preferably magnetized, by the above described process, so that the top surface 80 includes a north pole and a bottom surface 90 includes a south pole. The second conveyor belt 50 rotates in the direction illustrated by the arrows for moving the magnets 20 thereon along a plurality of workstations 100 where the magnets 20 are manually taken therefrom with the assistance of tweezer-like devices. Due to the magnetization of the second conveyor belt 50 and the magnets 20, the magnets 20 will drop onto the top surface 80 with its south pole abutting the north pole of the second conveyor belt 50. Therefore, all the magnets 20 will have their north pole exposed so that production worker stationed at the workstations 100 can readily identify their magnetic orientation.

The first 10 and second 40 conveyors have the rotation induced to them by rollers 110 which are activated by electrical motors 120, as is well known in the art. The conveyors 10 and 40 also include variable speed control for permitting efficient production and a stop and start feature for the same purpose.

The invention has been described with reference to a preferred embodiment. However, it will be appreciated that variations and modifications can be effected by a person of ordinary skill in the art without departing from the scope of the invention.

Parts List:
- 10 first movable conveyor
- 20 miniature, bi-polar magnets
- 30 first conveyor belt
- 40 second movable conveyor
- 50 second conveyor belt
- 60 first layer
- 70 second layer
- 80 top surface
- 90 bottom surface
- 100 workstations
- 110 rollers
- 120 motors

We claim:

1. A system for readily determining magnetic orientation of permanent magnets for mass assembly in a predetermined orientation into electronic or mechanical devices, the system comprising:

(a) a movable conveyor including a conveyor belt having a first surface which is magnetically polarized in a predetermined orientation, and having a second surface which is magnetized of opposite polarity from the first surface;

(b) means for individually placing the magnets on the conveyor belt which, in association with the conveyor belt, orients the magnets in a preferred orientation on the conveyor belt; and (c) means for moving the conveyor belt for passing the magnets through a mass production assembly.

2. The system as in claim 1, wherein said conveyor includes speed control.

3. The system as in claim 2 further comprising means for inducing motion to said conveyor.

4. The system as in claim 1, wherein said conveyor belt comprises a flexible binder material mixed with either a ferrite material or a rare-earth material.

5. The system as in claim 4, wherein the flexible binder material includes nitrate rubber.

6. The system as in claim 4, wherein the ferrite material includes barium ferrite.

7. The system as in claim 4, wherein the rare-earth material includes either samarium cobalt or neodymium-iron-boron.

* * * * *